July 1, 1969  J. G. NAGY  3,453,017
LIFTING SPREADER CORNER GUIDES
Filed Aug. 29, 1966
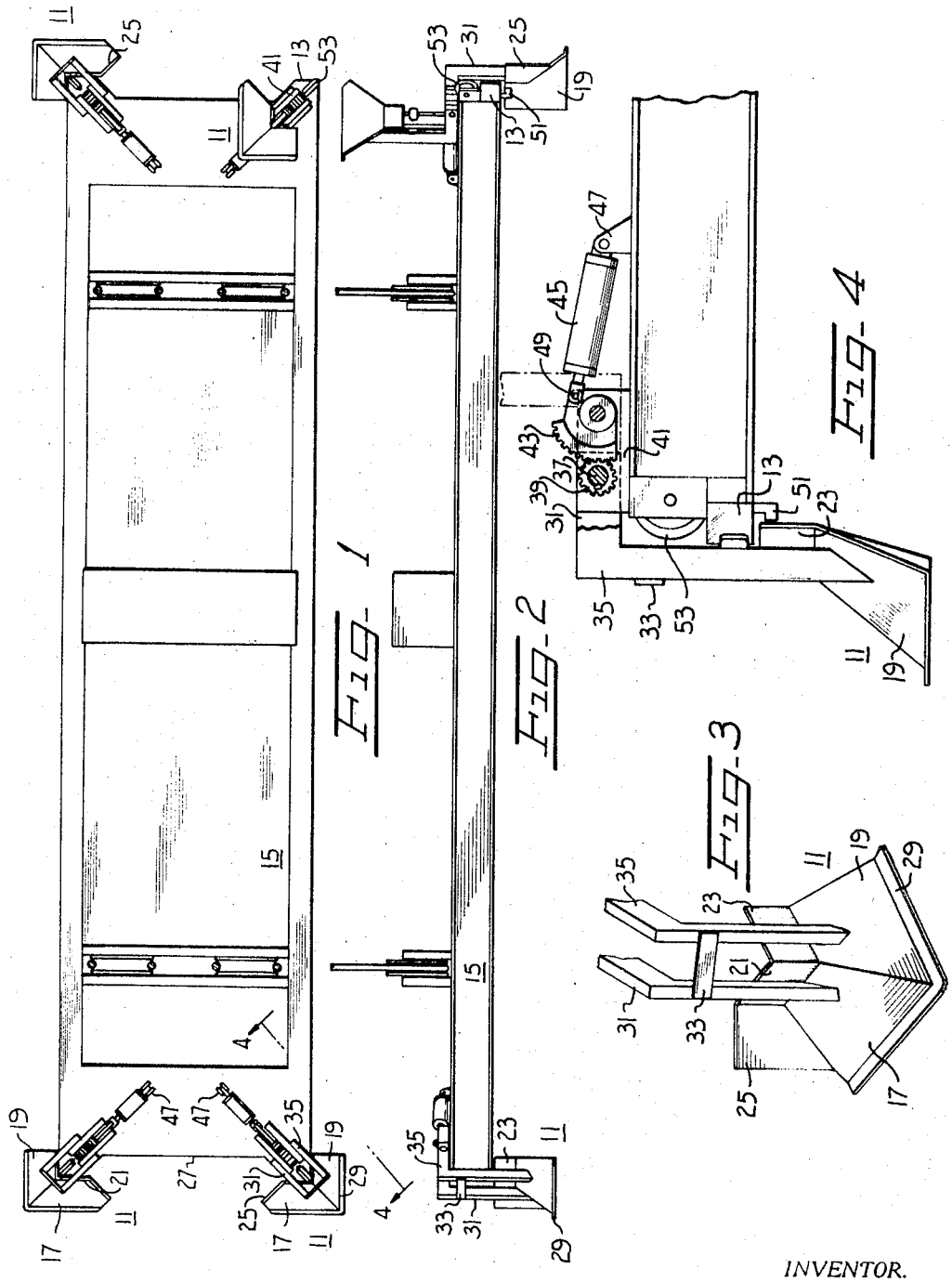
INVENTOR.
JULES G. NAGY
BY
Charles O. Bruce
ATTORNEY United States Patent Office 3,453,017
Patented July 1, 1969

3,453,017
LIFTING SPREADER CORNER GUIDES
Jules G. Nagy, Oakland, Calif., assignor to Pacific Coast Engineering Company, a corporation of California
Filed Aug. 29, 1966, Ser. No. 575,659
Int. Cl. B66c 1/10
U.S. Cl. 294—67                                          4 Claims

ABSTRACT OF THE DISCLOSURE

An apparatus for aligning a cargo container lifting spreader with a cargo container. Inverted funnel sections are rotatably positioned at the corners of the lifting spreader and are individually rotatable in a vertical plane to a position above and within the periphery of the lifting spreader.

BACKGROUND OF THE INVENTION

Field of the invention

The present invention relates to guide means for positioning a cargo container lifting spreader in alignment over a cargo container for effecting lifting engagement therewith and more particularly to a set of corner guides for a cargo container lifting spreader.

Description of the prior art

Many types of cranes and structures have been utilized for the loading and unloading of cargo transported by ships, railroad cars, and flatbed trailer trucks. Presently, the efficient handling of crated and large-piece cargo is being effected by the use of cargo containers which can be loaded at the factory, moved to dockside on a flatbed trailer or railroad car, and loaded directly on board ship as a unit. These large cargo containers are handled by lifting spreaders which engage with the top surface of the cargo container. The containers are self-supporting to permit stacking in layers and their use permits greater amounts of cargo to be loaded or unloaded with each cycle of the cargo handling crane.

A problem which arises in attempting to speedily engage a lifting spreader with a cargo container occurs because the lifting spreader is suspended by flexible cables. When the crane operator swings a lifting spreader into position over a cargo container, it cannot be immediately engaged with the container as the spreader's momentum and its flexible suspension system causes it to swing with pendulum motion. Until the motion subsides or is arrested, the lifting spreader cannot be accurately aligned with the cargo container for proper engagement.

In order to increase the efficiency of the cargo container handling operations, it is necessary to reduce the spreader cycle time by providing means for rapidly engaging the lifting spreader with the containers. There are two ways by which this can be accomplished. One way is to provide an anti-sway device for the lifting spreader which will stop its swinging motion when the crane which supports it stops moving. Another way is to provide guide means for engaging the lifting spreader with the cargo container. Both methods of engaging the lifting spreader with the cargo container can be utilized simultaneously and both help abate the pendulum motion.

It is a requirement of the problem that the means which is utilized for assisting the engagement of the lifting spreader with the cargo container, or for guiding such engagement, must not project beyond the perimeter of the cargo container. This is necessary because cargo containers are stowed on board ship within cells by means of vertical cell guides. Therefore, the lifting spreader which deposits the cargo container in the cell must also fit within the cell limitations. This prevents any engagement guide means from being utilized which permanently extends beyond the sides of the cargo container.

A still further problem which must be considered in the design of guide means for facilitating the handling of cargo containers is that dock space or storage space is at a premium, and therefore cargo containers are usually piled in a tightly packed stack. In other words, the containers are located closely adjacent each other and picking out a particular container presents a peculiar problem. Likewise, the guide means must be able to acclimate to variable stacking arrangements. If only one corner of the container is accessible, the guide means must be able to operate based on the single exposed corner. It also must be able to function if only two or three corners are exposed.

SUMMARY OF THE INVENTION

Applicant has devised a new means for guiding a cargo container lifting spreader to engage with a cargo container which comprises, briefly, corner guides having inverted funnel sections disposed at each corner of the lifting spreader. Each of the funnel sections is retractable to a position above the spreader and means are provided for effecting the retracting.

The concept of the invention also includes the method of centering a cargo container lifting spreader on a cargo container and comprises: Providing a pair of inverted funnel sections at the ends of the lifting spreader and guiding the lifting spreader onto the top of the cargo container by means of the inverted funnel sections and the exposed corners of the cargo containers.

OBJECTS OF THE INVENTION

Therefore, it is an object of the present invention to provide a method for guiding a cargo container lifting spreader to proper engagement with a cargo container.

It is another object of the present invention to provide corner guides for a cargo lifting spreader which guide a cargo container lifting spreader to proper engagement with a cargo container.

It is a further object of the present invention to provide corner guides for a cargo lifting spreader which can be independently retracted to a position within the perimeter of the cargo container to permit the container and lifting spreader to be lowered into a cargo storage cell.

It is still another object of the present invention to provide corner guides for a lifting spreader which can guide a lifting spreader into engagement with a cargo container having only one of its upper corners exposed.

Other objects and advantages of the present invention will become apparent when the corner guides of the present invention are considered in conjunction with the accompanying drawings.

DESCRIPTION OF THE DRAWINGS

FIGURE 1 is a plan view of the cargo container lifting spreader with three of the four guides in operating position;

FIGURE 2 is a side elevation of a cargo container lifting spreader showing one of the corner guides of the present invention in operating position and one in retracted position;

FIGURE 3 is a detail perspective view of one of the corner guides;

FIGURE 4 is a sectional side elevation of one of the corner guides including its operating mechanism taken along line 4—4 of FIGURE 1.

DESCRIPTION OF THE PREFERRED EMBODIMENT

Reference is made to the drawings for a description of the invention. In the preferred embodiment thereof, a corner guide 11 depends from each of the corners 13 of the lifting spreaded 15 (FIGURE 1). These corner guides include a pair of angled guide plates 17, 19 (FIGURE 3) which form a portion of an inverted funnel section. The guide plates are angled, with respect to the vertical axis of the lifting spreader, inwardly from their lower edges.

A pair of vertical extensions 21, 23, secured together at right angles to each other, are secured to the upper edges of the guide plates 17, 19 and are closely aligned collateral to the corners 13 of the lifting spreader. These vertical extensions and the angled guide plates form inverted funnel sections.

Vertical edge guides 25 are secured to the vertical extension 21, which is parallel the ends 27 of the spreader, and to the edges of the angled guide plates 17. Only one vertical edge guide 25 is provided on each of the inverted funnel sections 11 and it is disposed oblique to the ends 27 of the lifting spreader. The vertical edge guides 25 form obtuse angles with outer sides of the adjacent vertical extension 21.

Horizontally disposed flanges 29 are secured to the lower edges of the guide plates. These flanges help prevent the inverted funnel sections from inadvertently puncturing the tops of the cargo containers, by spreading out the pressure load, and provide structural rigidity to the lower end of the funnel section.

The funnel sections 11 are secured to the lower ends of a pair of inverted L-shaped operating arms 31. The operating arms are welded to the upper surfaces of the guide plates and are provided with cross members 33 for supplying rigidity and maintaining the spaced relation between the arms.

The ends of the feet 35 of the operating arms are interlocked by pivot shafts 37 which are secured between the arms and have spur gears 39 disposed between the arms and keyed to the pivot shafts (FIGURES 1 and 4). The shafts are journalled to the lifting spreader 15 by means of vertical plates 41, disposed between the operating arms on each side of the spur gears, to permit the operating arms 31 to rotate in a vertical plane about the pivot shafts 37.

Segmental spur gears 43 are also journalled in the vertical plates 41 to pivot on the lifting spreader 15 in meshing engagement with the spur gears 39 on the pivot shafts 37 of the operating arms 31.

Independently operable hydraulic cylinders 45 rotate the segmental spur gears. The cylinders have one of their ends 47 secured to the lifting spreader and the other end 49 secured to the segmental gears at a point offset from their centers of rotation. This provides an effective moment arm on each of the segmental gears to rotate the gears when the pistons are expanded or contracted. Operation of the cylinders thereby effects rotation of the meshed segmental and spur gears and rotates the operating arms to effect retraction of the operating arms and the funnel sections 11. The independent operation of the cylinders 45 permits any one or all of the funnel sections to be rotated independent of the others, to the upright position illustrated at the right hand end of the lifting spreader of FIGURE 2 or to any position between operating and retracted.

The invention operates in a coordinated manner to load or unload ships or railroad cars or flatbed trailers or to stack or unstack cargo containers at a storage area. When the lifting spreader 15 is lowered onto a cargo container, the funnel sections 11 guide the spreader into correct alignment with the container. The locking bolts 51 of the spreader guide into recesses in the corners of the container and are then rotated approximately 90 degrees to engage under the lip of the recesses and lock the spreader to the container.

If the lifting spreader is mating with a cargo container which has all four upper corners exposed, the four inverted funnel sections, or "flippers" as they are called, are lowered to a depending attitude from the corners of the lifting spreader. The spreader is then settled onto the container and guided into proper engaging relation by all four of the funnel sections.

When it is desired to lower the cargo container into the hold of a ship which is provided with cell guides, the four flippers are rotated to the upward position whereby they are retracted within the perimeter of the rectangle formed by the corners of the lifting spreader. The containers can then be lowered into the cells without the flippers interfering with structural framework of the cells. The tapered rim wheels 53 disposed at the extending corners (FIGURE 2) of the lifting spreader ride in the cells guides which are disposed at the corners of the cells. The cell guides are usually provided in the form of right angled vertical guide bars.

When it is desired to remove a single container from a stack of cargo containers, e.g., when the cargo containers are stacked closely adjacent each other, various combinations of flipper attitudes are used. If only one corner of the cargo container is exposed, the flippers at the three corners of the spreader corresponding to the three unexposed corners of container are raised and the spreader guided on the container by means of the one flipper (and the surrounding containers if they are stacked higher than the one being picked off). If two or more upper corners of the container are exposed, then the flippers corresponding to the exposed corners are left in operating position and only the flippers corresponding to the unexposed corners are raised. If the container is only surrounded by containers stacked at the same level, then the flippers which must be raised need only be retracted approximately 90°, but if the surrounding containers are stacked higher, those flippers must be fully retracted within the perimeter of the containers.

During vertical lowering of the spreader onto the container, it is the angled guide plates 17, 19 which are primarily responsible for centering and guiding the spreader onto the container. But, when only two of the flippers on one side of the spreader are being utilized, the vertical edge guides 25 help center the spreader longitudinally with the respect to the container as the spreader is moved toward and onto the container from the exposed side.

It is also within the concept of the invention to provide a new method of guiding a cargo container lifting spreader on a cargo container. This comprises providing a pair of inverted funnel sections at the ends of the lifting spreader, the funnel sections being independently retractable to a position with the periphery of the cargo container, retracting the funnel sections corresponding to the upper corners of the cargo container which are not exposed, and guiding the spreader onto the container by means of the unretracted funnel sections.

It will be apparent from the foregoing description of the invention in its preferred form that it will fulfill all of the objects attributable thereto. While it has been illustrated and described in considerable detail, the invention is not to be limited to such details as have been set forth except as may be necessitated by the appended claims.

I claim:
1. Corner guides for a lifting spreader comprising
    an inverted funnel section depending from each of the corners of said lifting spreader, said funnel sections being secured to the ends of inverted L-shaped operating arms, said arms being pivoted at the ends of their feet and adapted to rotate in a vertical plane and to retract to a position above and within the perimeter of the rectangle formed by the corners of the lifting spreader,
    spur gears secured to the pivot axes of said operating arms,
    segmental spur gears meshing with said spur gears, and hydraulic cylinders secured to said lifting spreader and engaged with said segmental gears for rotating said funnel sections in a vertical plane, said cylinders being independently operable.

2. The corner guides of claim 1 wherein each of said funnel sections includes,
a pair of angled guide plates angled inwardly from their lower edges with respect to the vertical axis of the lifting spreader,
a pair of vertical extensions secured at right angles to each other and secured to the upper edges of said guide plates collateral to the corners of said lifting spreader, and
a vertical edge guide secured to the edge of one of said guide plates and one of said vertical extensions, said edge guide being disposed oblique to the end of said lifting spreader and forming an obtuse angle with the outer side of the adjacent vertical extension.

3. A funnel section for a lifting spreader corner guide comprising
a pair of angled guide plates angled inwardly from their lower edges with respect to the vertical axis of the lifting spreader,
a pair of vertical extensions secured at right angles to each other and secured to the upper edges of said guide plates collateral to the corners of said lifting spreader,
a vertical edge guide secured to the edge of one of said guide plates and one of said vertical extensions, said edge guide being disposed oblique to the end of said lifting spreader and forming an obtuse angle with the outer side of the adjacent vertical extension, and
horizontally disposed flanges secured to the lower edges of said angled guide plates.

4. Corner guides for a cargo container lifting spreader comprising
an inverted funnel section disposed at each corner of said lifting spreader, each of said funnel sections being supported in a depending attitude by an inverted L-shaped arm pivoted at the end of its foot and rotatable in a vertical plane to a position above and within the periphery of said spreader, and
means for independently rotating said funnel sections to said rotated position including independently operable hydraulic cylinders connected to segmental spur gears meshing with spur gears secured to said L-shaped arms at the pivot axis of said arms.

References Cited

UNITED STATES PATENTS

| | | | |
|---|---|---|---|
| 3,024,919 | 3/1962 | Willison et al. | 212—14 |
| 3,086,807 | 4/1963 | Russell et al. | 294—67 |
| 3,101,967 | 8/1963 | Wyrough | 294—67 |

RICHARD E. AEGERTER, *Primary Examiner.*

U.S. Cl. X.R.

294—81